United States Patent [19]
Black et al.

[11] 3,725,938
[45] Apr. 3, 1973

[54] DIRECTION FINDER SYSTEM

[75] Inventors: Stanley H. Black; Richard B. Formeister, both of Phoenix, Ariz.

[73] Assignee: Sperry Rand Corporation, New York, N.Y.

[22] Filed: Oct. 5, 1970

[21] Appl. No.: 77,927

[52] U.S. Cl. .................. 343/120, 343/701, 343/705, 343/833, 343/836
[51] Int. Cl. .................................................. G01s 3/20
[58] Field of Search ....... 343/113 DE, 120, 701, 833, 343/836

[56] References Cited

UNITED STATES PATENTS

| | | | |
|---|---|---|---|
| 3,560,978 | 2/1971 | Himmel et al. | 343/833 X |
| 2,620,471 | 12/1952 | Blodgett et al. | 343/120 X |

*Primary Examiner*—T. H. Tubbesing
*Attorney*—S. C. Yeaton

[57] ABSTRACT

A high frequency radio direction finder receiver system of the over-lapping lobe switching type utilizes an array of lineal antenna elements formed of crossed multiple-element receiver antenna systems sharing one directly coupled receiver antenna element in common. Lobe switching is afforded through bias voltage control of a characteristic of the elements by semiconductor switching circuits.

10 Claims, 4 Drawing Figures

INVENTORS
STANLEY H. BLACK
RICHARD B. FORMEISTER
BY
ATTORNEY

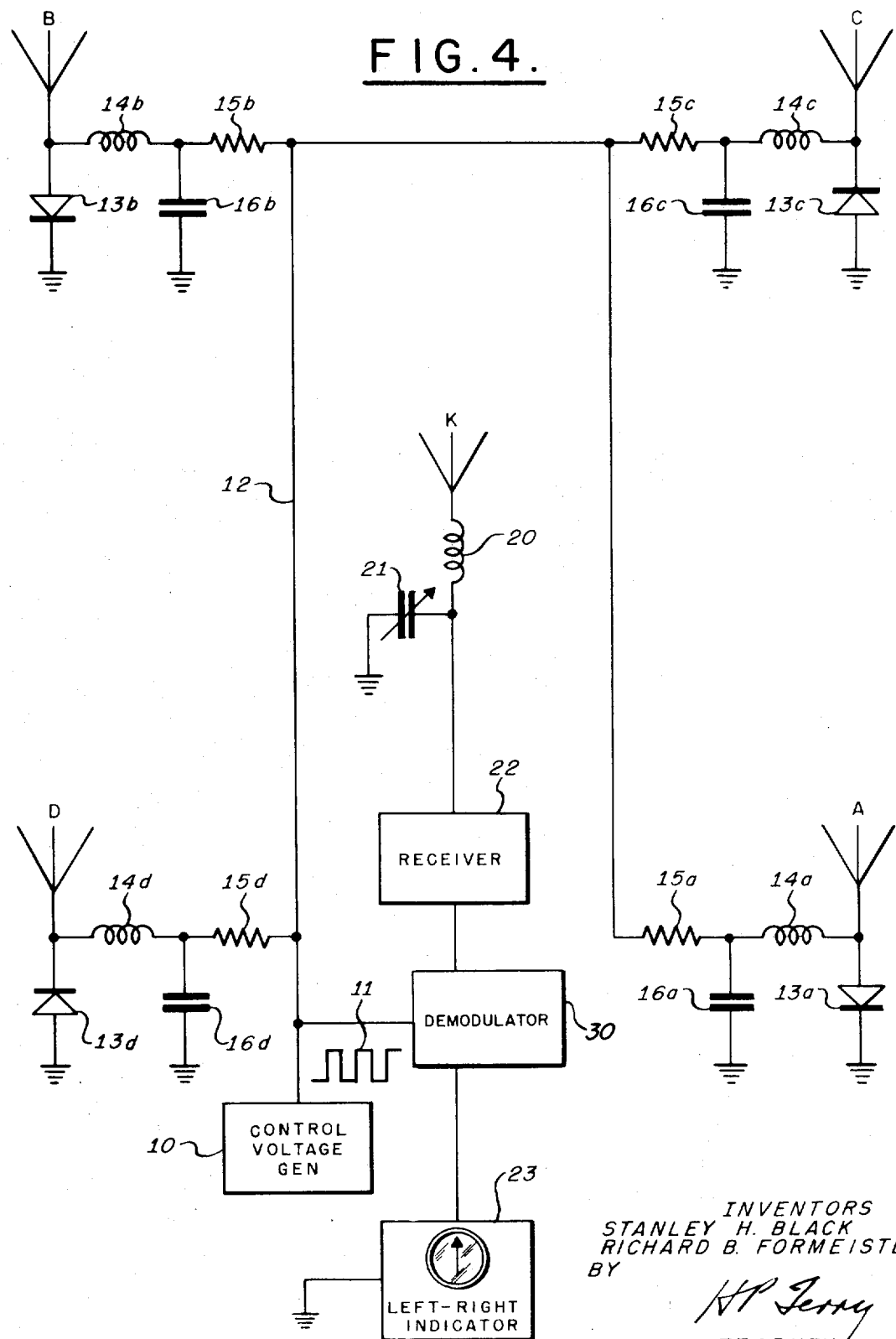

DIRECTION FINDER SYSTEM

BACKGROUND OF THE INVENTION

1. Field of the Invention

The invention pertains to the art of high frequency radio direction finding and more particularly relates to receiver antenna means and receiver antenna lobe switching means of the non-mechanical type cooperatively serving as a navigation aid in piloting a vehicle or in landing an aircraft.

2. Description of the Prior Art

Prior art systems include radio direction finding receiver systems operating with very high frequency or ultra high frequency antennas designed for use in aircraft as aids to navigation and particularly as aids in the landing of aircraft. Systems suitable for the latter function are often desired, for instance, for emergency use or for landing of aircraft in fields not equipped with the very complex non-mobile instrument landing transmitters customarily found in service at regularly used airports.

It is desired, for example, to provide azimuth information in an aircraft with simple direction finding receiver apparatus, where the transmitter, located at a fixed point generally at ground level, is a simple, portable, omnidirectional transmitter. Prior art radio direction finder systems for the purpose have required the use of null seeking loops as direction finding antennas, of interferometric methods, or of lobed cardiod receptivity patterns generated by mechanical switching of multiple active receiver antenna elements with respect to the direction finder receiver input circuit.

The commutation or switching of the multiple antenna elements of prior art lobed systems is one main source of defects. Subject to wear and consequent deterioration, such prior art switching systems tend to be lossy and often require complex matching as well as multiple and sensitive tuning means. Narrow band operation and unreliability are often a consequence of such requirements. Calibration sensitivity to carrier frequency is also a disadvantage.

The nature of the antenna system selected for use with prior art direction finder systems has compounded the difficulties. Freedom from polarization-induced pointing error with pitch and roll of the aircraft has been lacking. Adverse sensitivity to the site of the antenna on the aircraft has been present, as well as lack of linear and wide non-ambiguous response. Prior art antennas demonstrate boresight errors as carrier frequency is changed and do not discriminate against signals originating to the rear of the antenna.

SUMMARY OF THE INVENTION

The present invention is a high frequency radio direction finder antenna and a receiver system adapted for use for navigating aircraft. An antenna array of the over-lapping, lobe-switching type is employed, the antenna having a pair of crossed multiple-element antenna systems each composed of lineal elements. Each one of the pair of crossed systems alternately creates a corresponding receptivity pattern when in one of two alternating cyclic states. A centrally located lineal antenna element common to the crossed systems directs a signal whose phase and amplitude respectively represent pointing sense and error to a pointing or direction error display. Cyclic change of state of the lineal antenna elements and consequent lobe switching is produced by reliable voltage-controlled semiconductor circuits associated with, for example, four of the lineal antenna elements. Only the un-switched central antenna element is connected to the direction finder receiver input circuits.

The direction finding system is effectively free of polarization-induced pointing error, since the antenna has no horizontal elements, and is thus substantially insensitive to pitch or roll of the aircraft. Further, the system exhibits lesser site dependence than other homing systems, boresight errors with variation in carrier frequency are greatly reduced, and the antenna is substantially insensitive to signals originating at its rear. The system exhibits a wide, linear, and non-ambiguous relation between actual displacement of the craft and the displayed azimuth information.

BRIEF DESCRIPTION OF THE DRAWINGS

FIG. 4 is an electrical circuit for operating the antenna.

DESCRIPTION OF PREFERRED EMBODIMENT

Figure 1:
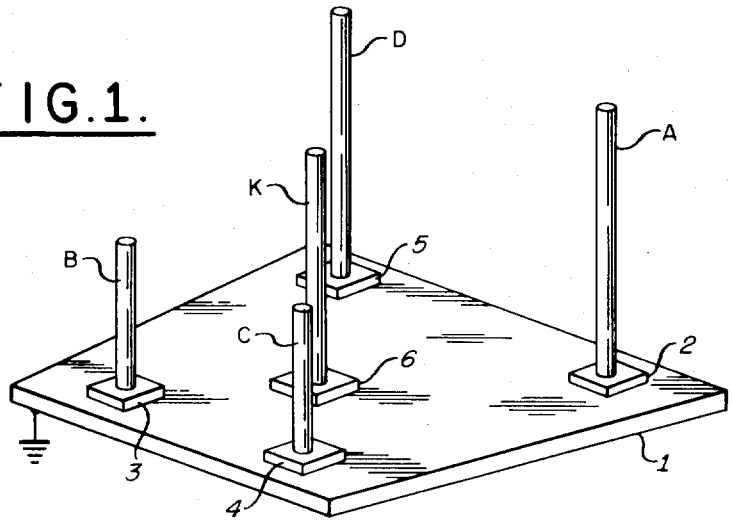
FIG. 1 is a perspective view of the antenna of the present invention.
Figure 2:
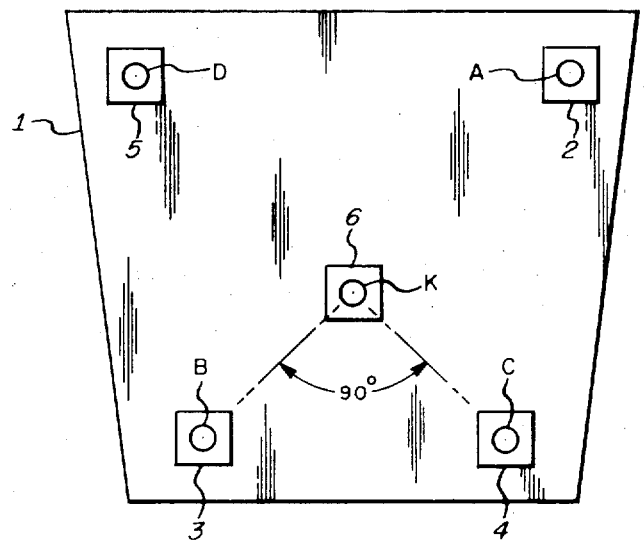
FIG. 2 is a plan view of the device of FIG. 1.
Figure 3:
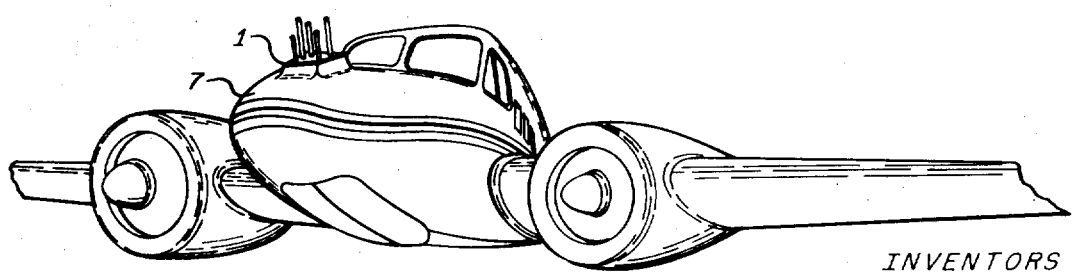
FIG. 3 is a perspective view of the antenna of FIGS. 1 and 2 mounted on an aircraft.

FIGS. 1, 2, and 3 illustrate the physical configuration of the novel radio direction finding antenna array and are therefore of interest in discussing its active radiation receiving structure, all of which is mounted above electrically conducting ground or grounded base plate 1. Plate 1 is in the form of an isosceles trapezoid, though a wide variety of other shapes are suitable, and may be made of one quarter inch thick aluminum having a flat or moderately curved upper surface. Plate 1 and the radiation receiving structure supported by it are adapted to be fastened to a generally upward-facing surface 7, for instance, of the forward section of an aircraft fuselage, as seen in FIG. 3. Otherwise, conductive plate 1 may form an integral part of the craft fuselage or other vehicle body.

Antenna ground plate 1 supports five lineal rod-shaped receiver antenna elements, A, B, C, D, and K, one of which, K, is conductively coupled to the direction finder receiver. Each lineal antenna rod element projects centrally through a respective clearance hole (not seen) in base plate 1, is generally perpendicular to plate 1, and is supported by an insulator device from plate 1. For example, the left reflector rod A is mounted in an insulator device 2 fastened by conventional means to base plate 1 and passes through insulator device 2 so as to be available for connection of a control circuit to the end of rod A beneath plate 1. The lineal right reflector rod D is similarly mounted in an insulator device 5 for connection to a control circuit located below ground plate 1. The respective left and right lineal director rod elements B and C are respectively supported by individual insulator devices 3 and 4 in insulated relation to base plate 1 within associated clearance holes therein. The lower ends of rods B and C are also accessible below ground plate 1 for connection to a control circuit yet to be described. The centrally located lineal rod element K is similarly supported in non-contacting relation with ground plate 1 through the agency of insulating device 6 fastened to the upper surface of plate 1. The bottom end of rod 1 is adapted to be connected, for instance, to the input of a conventional direction finder receiver to be described.

Rod K is disposed at the intersection of an imaginary dot-dash line drawn between rods C and D and such a line drawn between rods A and B, these imaginary lines being substantially mutually perpendicular.

In a generally representative version of the antenna array for operation in the band of frequencies between 335 and 350 megacycles per second, the director antenna rod elements B and C are constructed of one quarter inch aluminum rod and project 6.2 inches above the upper surface of ground plate 1, while the otherwise similar reflector rod A and D elements project 8.8 inches. Rod K similarly projects 7.92 inches. The reflector rods A and D are 4.75 inches from receiver rod K, while the director rods B and C are each spaced 3.5 inches from receiver rod K. These representative dimensions may be adjusted in accordance with the desired directivity of the antenna array.

Thus, the receiver direction finding antenna consists of an array of five or more rod elements, each insulated from ground plate 1 and substantially perpendicular thereto. The combination of center rod element K and any two diagonally located members, such as rod elements A and B, forms one directive receiver antenna system. The receiver radiation pattern is directed to the right by shorting rod elements A and B to ground and by breaking the control circuit connection to rod elements C and D. The received radio frequency carrier signal is derived by direct conductive coupling at the bottom of rod K in a manner to be more fully explained. Similarly, the receptivity pattern of the antenna array is pointed to the left by open-circuiting rod elements A and B and simultaneously connecting rod elements C and D to ground.

The circuit for controlling the operation of elements such as A, B, C, and D is illustrated in FIG. 4; satisfactory operation of the circuit depends upon its ability to produce programmed substantially open and closed circuit states at the bases of rod elements such as A, B, C, and D. For controlling such switching, control voltage generator 10 produces a symmetrically cycled pulse train 11 which may, for instance, range between plus and minus 15 volts at a convenient audio switching frequency, such as 100 cycles per second. The action of signal 11 when supplied via bus 12 can be explained with reference to FIG. 4 and to the circuit for controlling the state of the left reflector rod element A, whose bottom end is connected through diode 13a to ground, such as to plate 1. Bus 12 is connected through resistor 15a and inductance 14a to a point between rod A and a PIN diode 13a. The junction between resistor 15a and inductance 14a is coupled to ground via capacitor 16a. In a system operating in the aforementioned frequency range, the following circuit parameters are representative of those found useful:

| inductance 14a | 70 nanohenries |
| resistor 15a | 1200 ohms |
| capacitor 16a | 270 picofarads |

With these or other properly adjusted circuit parameters depending upon the internal nature of diode 13a, rod element A acts as an active parasitic reflector element when signal 11 causes diode 13a to be forward-biased; rod element A behaves substantially as a completely inactive open element invisible to the incoming radiation field when diode 13a is reverse-biased. Thus, rod A is made substantially fully active and substantially fully inactive as wave train 11 progresses.

It is seen that when the switching control voltage 11 is positive, the PIN diode 13a conducts and rod element A becomes a parasitic element of the array. When voltage 11 is negative, the PIN diode 13a is reverse-biased. The physical capacitance to ground of rod element A and the capacitance of the reverse biased diode 13a are brought into parallel resonance with choke 14a. Element A is then completely isolated from ground and becomes electrically invisible to incoming radiation.

In a similar manner, the left director rod element B, associated with diode 13b, inductance 14b, resistor 15b, and capacitor 16b, is made alternatively active and inactive in synchronism with the state of rod A by signal 11 applied via bus 12 to resistor 15b. Since diodes 13a and 13b are similarly poled, rod elements A and B are cyclically simultaneously active and simultaneously inactive. When simultaneously active, a directive receptivity pattern is pointed to the left. As will be seen, rod elements C and D are arranged to have substantially no influence upon the situation when rod elements A and B are active.

Similar control circuits, activated by audio wave 11 from bus 12, operate in connection with the right reflector rod element D and the right director rod element C. As seen in FIG. 4, the circuit controlling the right reflector D includes diode 13d, inductance 14d, resistor 15d, and capacitor 16d, while the circuit controlling the associated right director C includes diode 13c, resistor 14c, inductance 15c, and capacitor 16c. The circuits are similarly adjusted to those associated with antenna elements A and B, but diodes 13c and 13d are both poled opposite to the polarization of diodes 13a and 13b. The conduction state of diode pairs 13c and 13d therefore occurs 180 electrical degrees from the conduction state of diode pairs 13a and 13b and reversal occurs at the audio frequency of wave 11.

Continuing operation of control voltage generator 10 permits cyclic lobe switching of the antenna array directive receptive pattern from a first direction determined by antenna elements A, K, and B to a second direction determined by antenna elements C, K, and D, establishing a boresight or null direction for antenna K at mid-angle between the two receptivity patterns. Where additional director and reflector elements are employed, similar associated diode control circuits may be used.

Antenna K is coupled through grounded plate 1 to an associated direction finder receiver 22 and indicator system 23, both of which may be conventional in nature and of the type ordinarily found in array direction finders or, in principle, in overlapping radio beam instrument landing systems. For example, antenna K will be tuned to the incoming carrier signals by adjustment of the tuning of inductance 20 and capacitor 21, so that such signals are effectively applied to radio frequency receiver 22.

With the antenna array being pointed cyclically to the left and to the right, a square wave modulation is generally impressed upon the incoming carrier. The phase and amplitude of the modulation depends, as is well known, upon the direction of arrival of the carrier wave with respect to the boresight or null axis of the array. The resultant impressed audio modulation is recovered by receiver 22 and is synchronously demodulated for supply to left-right indicator 23 by a conventional demodulator circuit 30 supplied with wave train 11 as a phase reference. As is conventional practice, the polarity of the demodulated audio signal is a bipolar direct current signal that represents a left or right sense of the deviation or error with respect to the antenna null axis. The amplitude of the demodulated or bipolar signal represents magnitude of departure from the null axis. Mounted within an aircraft cabin, indicator 23 displays to the observer the aircraft pointing error with respect to the direction of incoming carrier radiation, i.e., pointing error with respect to a simple radiating omni-directional transmitter which may, for instance, be located on the ground.

A switching and antenna system according to the present invention demonstrates numerous advantages over direction finder systems previously suggested for aircraft homing or direction finder use. Its measured gain of better than 4.0 db. with respect to a standard monopole is impressive in comparison to the often negative gains characterizing prior antennas. Thus, no preamplifier stages are required in receiver 22 and noise problems are effectively eliminated. Properly located, siting errors are minimal with only small effects on the receptivity pattern shape and on the relation of indicator deflection as a function of angle of deviation from the boresight direction. The indicator 23 yields a substantially linear output over a range greater than ±65° from the boresight or null direction. With proper location of the antenna on an aircraft, false sensing reversals are absent substantially to ±120° with respect to the boresight axis. A ±50° linear range and a ±90° non-ambiguous range characterizes certain prior systems.

Prior homing antenna systems show azimuth angle errors as high as 0.72° per degree of aircraft roll, a disturbing error to deal with during a landing maneuver. A measured roll polarization sensitivity of less than 0.04 azimuth degrees per degree of aircraft roll is provided by the present invention when siting is optimum. A band width of substantially 12 megacycles per second is afforded, frequency response being substantially symmetric. Stable high directivity and gain characteristics are assured for the antenna system with long life, broad band operation through the use of the novel switching system. No troublesome mechanically moving switching or signal coupling parts are present and prior requirements for the use of highly sensitive tuning and shielding therewith are largely eliminated.

It will be understood by those skilled in the art that the reciprocity theorem applies to operation of the invention and that it may be made to operate in a transmission mode as well as for reception of carrier signals. Accordingly, phrases referring to radiation patterns in the following claims will be understood to include both types of patterns, receptivity patterns as well as those associated with an energy transmitter. It will also be understood that additional directors or reflectors may be used, and that the antenna system may include more than two arrays of controlled elements.

While the invention has been described in its preferred embodiment, it is to be understood that the words which have been used are words of description rather than of limitation and that changes within the purview of the appended claims may be made without departing from the true scope and spirit of the invention in its broader aspects.

We claim:

1. A direction finding radio receiver system comprising:

conductive ground plane means,
   lineal receiver antenna means insulatingly supported substantially at right angles with respect to said ground plane means,
   first and second lineal radiation pattern-shaping means in substantially coplanar, spaced relation with and on opposite sides of said lineal receiver antenna means,
   said first lineal radiation pattern-shaping means comprising first radio wave reflector means,
   said second lineal radiation pattern-shaping means comprising first radio wave deflector means,
   first and second diode means respectively coupled from said first reflector means and said first deflector means to said ground plane means,
   control means synchronously cyclically forward and reverse biasing said first and second diode means to conduction and to non-conduction, and
   first and second circuit means for resonating the capacitances of said first reflector means and of said first deflector means and of the said respective first and second diode means when said first and second diode means are reverse-biased for rendering said first reflector means and said first deflector means ineffective.

2. Apparatus as described in claim 1 comprising:
   third and fourth lineal radiation pattern-shaping means in substantially coplanar spaced relation with and on opposite sides of said lineal receiver antenna means,
   said third lineal radiation pattern-shaping means comprising second radio wave reflector means,
   said fourth lineal radiation pattern-shaping means comprising second radio wave deflector means, and
   third and fourth diode means respectively coupled from said first reflector means and from said first deflector means to said ground plane means and poled in reverse to the polarity of said first and second diode means,
   said third and fourth diode means being cyclically alternately forward-biased and reverse-biased by said control means.

3. Apparatus as described in claim 2 additionally comprising second and third circuit means for resonating the capacitances of said second reflector means and of said second deflector means and of said respective third and fourth diode means when said third and fourth diode means are reverse-biased for rendering said second reflector means and said second deflector means ineffective.

4. Apparatus as described in claim 3 wherein:

said first and second pattern-shaping means and said lineal receiver antenna means lie substantially in a first plane, said third and fourth pattern-shaping means and said lineal receiver antenna means lie substantially in a second plane, and said first and second planes are substantially mutually perpendicular.

5. Apparatus as described in claim 3 comprising:

radio receiver means connected to said lineal receiver antenna means, demodulator means responsive to said radio receiver means, said demodulator being further supplied with an output of said control means as a phase reference signal, and right-left indicator means responsive to said demodulator means.

6. Radiation pattern modifying means for use with a radio direction finding system comprising lineal receiver antenna means insulatingly supported with respect to conductive ground plane means and coupled to supply carrier signals to receiver means, and said radiation pattern modification means comprising:

first lineal radiation pattern-shaping means spaced from said lineal receiver antenna means insulatingly supported adjacent one of its ends with respect to said ground plane means, first diode means connected to said end and to said ground plane means, control means cyclically alternately forward-biasing said diode means to conduction and reverse-biasing said diode means to non-conduction, and circuit means for resonating the effective capacitance to ground of said first diode means and of said first lineal pattern-shaping means during non-conduction of said first diode means for rendering said first lineal pattern shaping means ineffective.

7. Apparatus as described in claim 6 wherein said first lineal radiation pattern-shaping means is so spaced relative to said lineal antenna means as to serve as a radiation reflector means only when said first diode means is forward-biased.

8. Apparatus as described in claim 6 wherein said first lineal radiation pattern-shaping means is so spaced relative to said lineal antenna means as to serve as a radiation director means only when said first diode means is forward biased.

9. Apparatus as described in claim 6 comprising second lineal radiation pattern-shaping means spaced from said lineal antenna means opposite said first lineal radiation pattern-shaping means, insulatedly supported adjacent one of its ends with respect to said ground plane means.

10. Apparatus as described in claim 9 comprising:

second diode means connected to said end of said second lineal radiation pattern-shaping means, said second diode means being cyclically forward-biased and reverse-biased by said control means, circuit means for resonating the effective capacitance to ground of said second diode means and of said second pattern-shaping means during non-conduction of said second diode means, said first and second lineal pattern-shaping means, said first and second diode means, said control means, and said first and second resonating circuit means being so constructed and arranged as to cause said first and said second lineal pattern-shaping means cyclically and synchronously to be effective and to be substantially ineffective.

* * * * *